Nov. 19, 1968   D. A. WOOD   3,411,971

METHOD OF SEPARATING FRIT-SEALED GLASS BODIES

Filed Sept. 2, 1966

INVENTOR.
DOYLE A. WOOD
BY
Robert E. Strausser
ATTORNEY 3,411,971
METHOD OF SEPARATING FRIT-SEALED GLASS BODIES
Doyle Alfred Wood, Ottawa, Ohio, assignor to Sylvania Electric Products Inc., a corporation of Delaware
Filed Sept. 2, 1966, Ser. No. 576,890
5 Claims. (Cl. 156—344)

This invention relates to a method of separating frit-sealed glass bodies and more particularly to a method of separating, with a view toward subsequent reuse, the panel assembly of a cathode ray tube from the funnel thereof.

Cathode ray tubes of the type adapted for use in television apparatus may have an all-glass envelope which includes a funnel portion and a face panel portion sealed together by a glass frit. Since these envelope parts are expensive, it is desirable from a cost standpoint to dis-assemble and reuse them if the finished tube is found to be defective.

One process for separating frit-sealed glass bodies utilizes an extended heating cycle to weaken the seal followed by the application of air into the interior thereof to create a pressure which tends to blow the bodies apart at the seal. This process is slow and costly, and the scrap resulting therefrom is high due primarily to cracking of the funnel and panel, and dripping of the hot frit onto the glass face panel surface.

Another method utilized involved etching the seal with hot acid, nitric, for example, and subsequently causing one of the bodies to expand or contract relative to the other to cause a cracking of the seal. While this method works well it suffers from several disadvantages. The operator is exposed to large amounts of the highly reactive nitric acid since a container must be provided to allow submergence of the cathode ray tube to a depth sufficient to place the seal area under the etching acid. Further, when dealing with cathode ray tubes suitable for use in color television apparatus there is a danger of formation of noxious gases if there should be a leak in the frit seal which would allow acid to enter the tube and come into contact with the steel aperture mask assembly which is mounted therein.

Accordingly, it is an object of the invention to reduce the aforementioned disadvantages and to efficiently and inexpensively separate glass bodies of the type used in cathode ray tubes.

It is another object of the invention to provide the above while reducing the hazards to the operator.

Still another object of the invention is the provision of a method for separating the face panel from the funnel portion of a color cathode ray tube without the danger of forming noxious gases.

These objects are accomplished, in one aspect of the invention, by the provision of a method of separating glass bodies frit sealed together at a junction area with the exterior of the frit seal overlapping the bodies which comprises abrasively removing the overlapping exterior of the frit seal, then thermally shocking the seal which incorporates stresses therein, and then mechanically shocking the seal to effect separation of the bodies.

The above-described method is extremely efficient and reduces the scrap due to breakage. Also, it reduces the hazards to the operator by eliminating the deep containers of nitric acid and eliminates the danger of the formation of noxious gases due to the action of the acid on the aperture mask assembly.

For a better understanding of the present invention, together with other and further objects, advantages, and capabilities thereof, reference is made to the following disclosure and appended claims in connection with the accompanying drawings in which:

Figure 1:
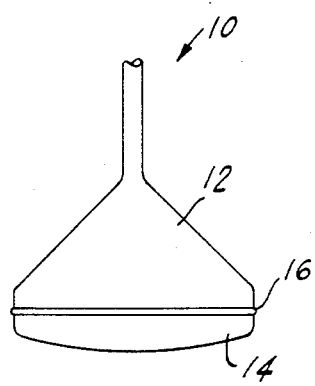
FIG. 1 is an elevational view of a cathode ray tube which may be utilized with the invention.

Referring now to the drawings with greater particularity, in FIG. 1 there is illustrated a cathode ray tube 10 of a type that may be salvaged by the method of this invention. The tube 10 is comprised of a funnel shaped body portion 12 and a face panel portion 14 sealed thereto by a frit seal 16 at a junction area 18. Both the funnel and face panel are glass and it is to be noted that other types of glass, frit-sealed devices may be salvaged by this method, the cathode ray tube herein described being exemplary only.

Figure 2:
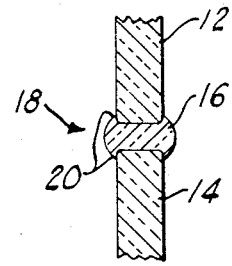
FIG. 2 is an enlarged sectional view of a portion of the seal area of the tube of FIG. 1.

The junction area 18 is shown enlarged and sectioned in FIG. 2. It can be seen here that the exterior 20 of frit seal 16 overlaps both the funnel portion and the face panel. The tube 10, which may be of the type utilized in color television apparatus, has a screen formed on the interior of face panel 14 and may have an aperture mask frame assembly positioned there within. The seal 16 is accomplished by positioning a frit ring around panel 14, placing funnel 12 thereon, and subsequently heating the frit and the junction areas of the funnel and panel to a fusion temperature. The frit ring may comprise any glass composition which is calcined or partially fused by heat at a temperature below the temperature necessary to provide vitrification.

When a cathode ray tube is found to be defective after construction and testing, it is advantageous from a cost standpoint to dis-assemble and reuse the envelope.

Figure 3:
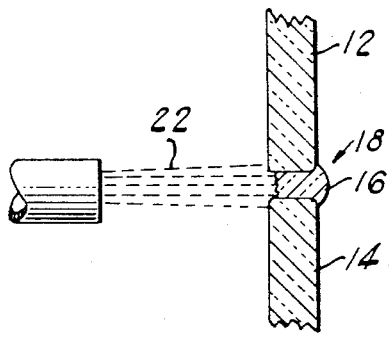
FIG. 3 illustrates one of the steps performed in accomplishing the method.

As a first step in a salvage process as taught by this invention, the exterior overlapping portion 20 of frit-seal 16 is abrasively removed. This may be accomplished as shown in FIG. 3 wherein the junction area 18 is bombarded by fluid carried abrasive particles 22 such as sand, alumina, or the like.

After the exterior 20 is removed the junction area 18 is thermally shocked to provide stresses within seal 16. This is accomplished by raising the temperature of the seal to approximately 130° F. as by running water of the necessary temperature thereover.

Figure 4:
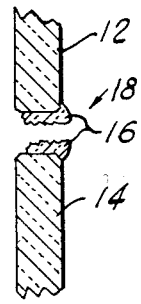
FIG. 4 illustrates the portions of the tube after separation.

While the seal temperature is raised the seal is mechanically shocked to provide separation, as is shown in FIG. 4. The mechanical shocking may be performed by giving the seal a sharp rap with a rubber mallet or similar implement or otherwise causing relative lateral displacement to occur between the funnel and the panel.

It will be seen from the above that this method is much simpler and far less hazardous than separation techniques used heretofore and it results in substantial cost savings.

The now separated funnel and panel may be subsequently chemically treated to remove the remaining frit still adhered thereto by placing them in a nitric acid bath. Because the pieces are separated, however, the acid bath holding containers for removing the frit may be relatively shallow vessels, say of the order of one inch deep which is not so hazardous to an operator as when the prior art methods of separation were utilized, the acid bath containers in that instance being of necessity some six to eight inches deep.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a method of recovering, for subsequent reuse, glass bodies frit sealed together at a junction area with the exterior of said frit seal overlapping said bodies the steps comprising: abrasively removing said overlapping exterior of said frit seal; thermally shocking the remainder of said seal to incorporate stresses therein; mechanically shocking said seal to cause separation of said bodies; and chemically treating the junction area of the bodies to substantially remove the frit remaining thereon.

2. In a method of separating glass bodies frit sealed together at a junction area with the exterior of said frit seal overlapping said bodies the steps comprising: abrasively removing said overlapping exterior of said frit seal; thermally shocking the remainder of said seal to incorporate stresses therein; and mechanically shocking said seal to cause separation of said bodies.

3. The method of claim 2 wherein said thermal shocking step comprises subjecting said remainder of said seal to temperatures in the range of 130° F.

4. The method of claim 2 wherein said mechanical shocking step comprises providing relative lateral movement between said bodies.

5. The method of claim 1 wherein said chemical treating step comprises subjecting said junction areas of said bodies to nitric acid.

References Cited

UNITED STATES PATENTS

| | | |
|---|---|---|
| 2,441,353 | 5/1948 | Gosmann et al. |
| 2,478,982 | 8/1949 | Rishell _____ 156—344 |
| 2,758,423 | 8/1956 | Lande _____ 51—320 X |
| 2,843,925 | 7/1958 | Logue et al. _____ 29—427 X |
| 2,884,312 | 4/1959 | Kuryla _____ 156—344 |
| 2,999,781 | 9/1961 | Davis _____ 156—344 X |
| 3,058,323 | 10/1962 | Claypoole _____ 156—344 X |
| 1,952,025 | 3/1934 | Witte. |
| 2,852,352 | 9/1958 | Landron. |

CHARLIE T. MOON, *Primary Examiner.*